Oct. 19, 1926.
F. A. HUBBARD
ELECTRICAL COMPENSATOR
Filed Jan. 4, 1921
1,603,283
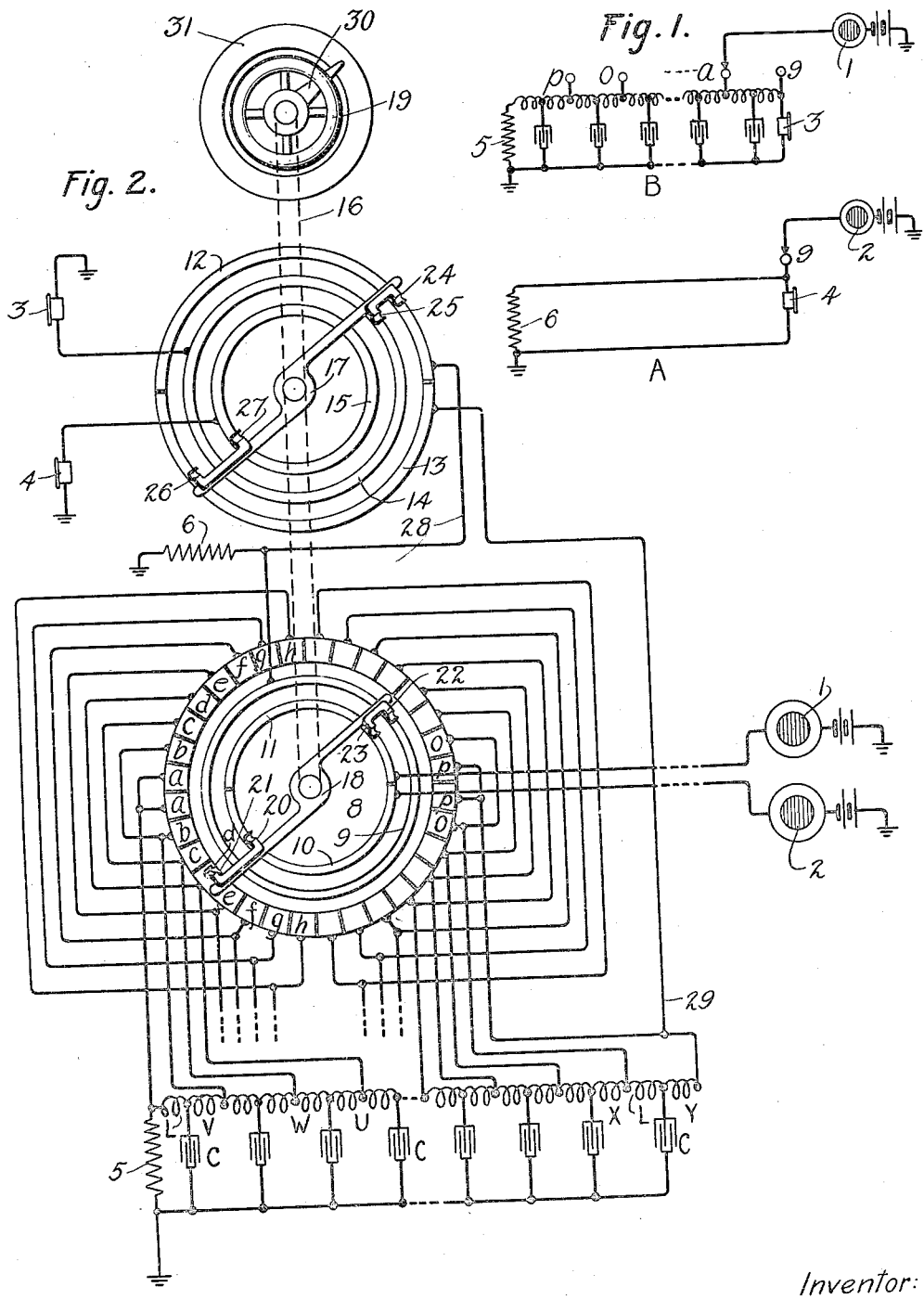
Inventor:
Francis A Hubbard
by Joel C.R. Palmer
Atty.

Patented Oct. 19, 1926.

1,603,283

UNITED STATES PATENT OFFICE.

FRANCIS ALLEY HUBBARD, OF WEST ENGLEWOOD, NEW JERSEY, ASSIGNOR TO WESTERN ELECTRIC COMPANY, INCORPORATED, OF NEW YORK, N. Y., A CORPORATION OF NEW YORK.

ELECTRICAL COMPENSATOR.

Application filed January 4, 1921. Serial No. 434,975.

The invention relates to an electrical compensator for use in a system for determining the direction of propagation of wave energy. Systems of this sort are well known and depend for their operation upon the accurate measurement of the difference in time of arrival of the same wave front at two separate points.

As this difference in time is in any case very small, special arrangements to measure it, have been resorted to one of the most successful of which consists in converting the wave energy at the point of interception into variations in electrical circuits and in operating upon the currents so produced by relatively varying the electrical lengths of such circuits to bring the waves into phase coincidence at an observing point, the necessary variation being a measure of the desired time interval.

An arrangement of this sort is described and claimed in my copending application, Serial No. 321,512, filed September 4, 1919, in which there are provided two transmission lines each equipped with a pair of translating devices such as a detector and telephone receiver and an artificial line or network, which is so arranged that a variable number of sections of it may be connected into either transmission line. The purpose of the artificial line or network is to effectively increase the electrical length of the transmission line with which it is included, thus serving to retard electrical waves transmitted thereover. The so-called binaural effect is utilized to determine the phase coincidence of the waves in the two lines, by virtue of which, if the waves arrive in phase at receivers held at the opposite ears of the observer a so-called binaural balance is obtained and the observer is affected as though a source of sound was directly in front of him.

As is pointed out in the above mentioned application, the amount of compensation or number of sections of artificial line, which it is necessary to include in either of the transmission lines to obtain a balance, is a measure of the time interval between the arrival of the wave front at the separated detecting points and may, by suitable calibration, serve as a direct indication of the direction of propagation of the wave energy.

It is an object of the present invention to improve upon the compensator disclosed in my former application in order to reduce the number of switching contacts used for varying the artificial line and by so doing to reduce the objectionable noise produced by the operation of such contacts, which noise may materially interfere with the accuracy of the balance.

In order to attain this object in accordance with a feature of the invention, an artificial line is provided which terminates at either end in its characteristic or surge impedance. The surge impedance at one end of the line may be effectively simulated by a translating device, such as a thermophone and a suitable impedance may be connected to the other end of the line. A transmitter or detector is arranged so it may be variably connected to taps extending from one side of each line section. Also in accordance with a feature of the invention a switching arrangement is provided so that the artificial line may be associated with either of two transmitters and receivers.

These and other features of the invention will more clearly appear from the detailed description and the accompanying drawings, in which Fig. 1 is a diagrammatic representation of one step of the operation of the compensator, and Fig. 2 is a circuit diagram showing the switches whereby the amount of compensation may be adjusted.

As shown in the above mentioned application, in order that the artificial line may equally affect waves of all frequencies, as far as shifting the phase thereof is concerned, the line must simulate a section of a distortionless transmission line of infinite length. The characteristics of such a line, in order to avoid reflection losses and distortion, must be such that the impedance seen from the point at which current enters the line is equal to the surge impedance of the line, which, in the case of a distortionless line, can be approximated by utilizing for the end section a pure resistance. In the compensator of the above mentioned application, this condition was approximately maintained regardless of the adjustment of the line by always including in the transmission line, with a variable number of intermediate sections, a terminating or end section of pure resistance. In accomplishing this result the intermediate sections were bodily transferred to and from the line by a switching device involving a large number of contacts. In accordance with the present invention, as shown in Fig. 1, the same result may be obtained in a simpler manner and with a less number of contacts.

In Fig. 1, 1 and 2 represent detectors 3 and 4 the receivers. The receivers may be of the non-inductive type, such as the ordinary thermophone, and their resistance may be chosen or adjusted so that it will approximate the surge impedance of the artificial line with which the receiver is adapted to work. As an alternative a standard type of receiver may be used with a terminating network as in the application referred to above. In the particular stage of operation of the system, as diagrammatically shown in Fig. 1, it is assumed that the line A is adjusted to its minimum electrical length and that the line B is adjusted to include one phase shifting section between the transmitter 1 and receiver 3. Both the lines A and B terminate, under all conditions regardless of the number of sections of artificial line which may be included therewith, in impedances 5 and 6, which also approximate the surge impedance of the artificial line. The detectors 1 and 2 are arranged so that they may be connected to any of the taps $a$, $b$, $c$, $d$, $e$, ... $p$, the arrangement being such, as will more clearly appear from the description of the actual switching arrangement provided, that when either of the detectors 1 or 2 is connected to one of the normal contacts 9, the other detector may be adjusted along the contacts $a$, $b$, $c$, $d$, ... $p$, respectively. The adjustment between the lines, being a relative one, is obtained by maintaining the electrical length of one line constant and varying the length of the other.

Assuming the condition illustrated in Fig. 1 and that the wave front is intercepted by detector 1 before it reaches detector 2, an electrical wave is generated at 1 a small time interval before a similar wave is generated at 2. The wave generated at 1, however, will enter the artificial line at contact $a$, will there divide and half of the current will proceed through the receiver 3 and the other half through the artificial line and the impedance 5. In passing from the point $a$ to the receiver 3, this wave is retarded by an amount which is determined by the electrical characteristics of the section of artificial line between the points 9 and $a$. On the other hand the wave generated at 2 passes directly to the receiver 4, the current at the point 9 dividing and passing in parallel through the impedance 6 and receiver 4. By varying the connection of the detector 1 to the points $a$, $b$, $c$, $d$, ... $p$, the electrical wave is retarded sufficiently to bring the waves of the two lines A and B in phase in the receivers 3 and 4, and a balance is obtained. Regardless of which of the points $a$, $b$, $c$, $d$, ... $p$, the detector 1 is connected to, the current will divide between the receiver 3 and the inpedance 5. This is apparent when it is considered that the artificial line simulates a line of infinite length and terminates in either end in its characteristic or surge impedance. Thus, looking into the line in either direction from the points $a$, $b$, $c$, $d$, ... $p$, the impedance is that of an infintely long line. In other words, if we have a line which simulates a line of infinite length, its impedance looking in either direction is that of an infinitely long line.

It is obvious that the detectors may be permanently associated with the artificial line and the receivers variably connected thereto without departing from the invention.

Referring now to the embodiment of the invention shown in Fig. 2, the artificial line consists of a number of sections, such as V, W, X, and Y, each including a series inductance L and a capacity C bridged across the line. This type of artificial line section is well known. This artificial line, including a number of these sections, terminates in one end, in the impedance 5 which is equal to the surge impedance of the particular line. In the case of the artificial line assumed, this impedance 5 is a pure resistance. The detectors are shown at 1 and 2 and in actual use are located a known distance apart under water for the purpose of picking up submarine sounds. The cooperating receivers are shown at 3 and 4. Taps from each of the sections of the artificial line extend to contacts such as $a$, $b$, $c$, $d$, $e$, ... $p$, which are mounted in the form of a circle on the compensator switch 8. Mounted in the same plane with these contacts is an annular contact 9 and a pair of semi-circular contacts 10 and 11. Mounted in a plane above these contacts are the semi-circular contacts 12 and 13 and the annular contacts 14 and 15. Carried by a shaft 16, indicated in dotted lines on the drawing, are two brush sets 17 and 18, the brush set 17 cooperating with the contacts 12, 13, 14, and 15, and the brush set 18 with the contacts 9, 10, 11 and $a$, $b$, $c$, $d$, ... $p$. The shaft 16 is operated from a hand wheel indicated at 19 which carries a pointer 30 adapted to move over a calibrated scale 31.

In the operation of the system, the receivers 3 and 4 are placed at the opposite ears of the observer and as soon as a sound is picked up at the detectors 1 and 2, the observer operates the hand wheel 19 until he receives the effect through receivers 3 and 4 of a sound directly ahead of him. When this adjustment has once been made, the pointer 30 will indicate the bearing of the sound source and its image from a given base line on the previously calibrated scale 31.

Assume, for example, that this balance is obtained with the shaft 16, the hand wheel and brush sets in the position shown in Fig. 2. Under this assumed condition an electrical wave generated at the detector 2, which it will be assumed is the detector which is first affected by the sound, passes from grounded battery, detector 2, contact 10, brush 20, brush 21, contact $d$ to section U of the artificial line and there dividing, through the impedance 5 to ground and through the artificial sections included between the section U and the end of the line to the conductor 29, contact 13, brush 26, brush 27, contact 15 to the receiver 4 and to ground. In passing through the sections of artificial line included between the section U and the receiver 4, this wave is retarded by an amount depending upon the number of sections of artificial line included therebetween. The later generated electrical wave generated at detector 1 passes from grounded battery, through detector 1, contact 11, brush 23, brush 22, contact 9, through the impedance 6 in parallel with a circuit including conductor 28, contact 12, brush 24, brush 25, contact 14, receiver 3 to ground. Turning the hand wheel 19, therefore, serves to include between one or the other detectors and its corresponding receiver a greater or less number of sections of artificial line.

What is claimed is:

1. In combination, a plurality of pairs of translating devices, a corresponding plurality of transmission lines, each terminating at one end in an impedance simulating the surge impedance of the line and in the other in the translating device of the corresponding pair, a phase shifting multi-section artificial line included in one of said transmission lines between said impedance and the translating device connected to the said line, switching means for interchangeably connecting the other translating device of each pair to said transmission lines, and means for varying the number of sections of artificial line included between the translating devices of the pair connected to the transmission line containing said artificial line.

2. In combination, a pair of detectors, a pair of translating devices, an artificial line including a plurality of phase shifting sections and a terminating section, switching means for including all of said phase shifting sections between one translating device and the terminating section and a variable number of phase shifting sections between either of said detectors and the translating device connected to said artificial line and means for connecting said other translating device in parallel with an impedance equal to said terminating section in series with said other detector.

3. In combination, a plurality of detectors, a corresponding plurality of translating devices, a transmission line comprising an artificial line including a plurality of intermediate sections and a terminating section, another transmission line, switching means for interchangeably connecting said translating devices with the end of said artificial line opposite the terminating section, means for interchangeably and variably connecting said detectors to said intermediate sections and simultaneously connecting the remaining detector and translating device to said other transmission line.

4. In combination, a plurality of sound detectors, a phase shifting artificial line, having variable points of connection along it, another line, a pair of translating devices, one connected to a terminal of each of said lines, switching means for successively connecting each of said sound detectors with said artificial line and simultaneously connecting another sound detector with the other line, and other switching means for varying the point of connection to said artificial line of the sound detector that is connected thereto by said first switching means.

5. In combination, a plurality of sound detectors, a phase shifting artificial line having variable points of connection along it, another line, a plurality of translating devices one connected to a terminal of each of said lines, switching means for interchangeably connecting each of said sound detectors with said artificial line and simultaneously connecting another sound detector with the other line and switching means for interchangeably connecting each of said translating devices with said artificial line and simultaneously connecting another translating device with the other line, and other switching means for varying the points of connection to said artificial line of the sound detector and translating device that are connected thereto by said first switching means.

6. In combination, a pair of sound detectors, a phase shifting artificial line having progressive points of connection along it for securing varying amounts of phase shift in waves transmitted over it, a movable contact for cooperating with said points of connection, another line having other transmission characteristics, a pair of indicators connected one to each of said lines, switching means for varying the position of said movable contact relative to said artificial line, and other switching means actuated in the operation of said first switching means for interchangeably connecting each of said sound detectors to said movable contact and simultaneously connecting the other sound detector to said other line.

7. In combination, a pair of sound detectors, a phase shifting artificial line having progressive points of connection along it for securing varying amounts of phase shift in waves transmitted over it, a movable contact cooperating with said points of connection, another line having other transmission characteristics, a pair of indicators adapted to be connected one to each of said lines, switching means for varying the position of said movable contacts relative to said artificial line, and other switching means actuated in the operation of said first switching means for interchangeably connecting each of said sound detectors and indicators to said artificial line and simultaneously connecting the other sound detector and translating device to said other line.

In witness whereof, I hereunto subscribe my name this 31st day of December, A. D. 1920.

FRANCIS ALLEY HUBBARD.